United States Patent
Winkler

(10) Patent No.: US 6,883,326 B2
(45) Date of Patent: Apr. 26, 2005

(54) ONE-SHOT ELECTRO-PNEUMATIC ACTUATOR

(75) Inventor: Daniel S. Winkler, Mesa, AZ (US)

(73) Assignee: The Boeing Company, Chicago, IL (US)

(*) Notice: Subject to any disclaimer, the term of this patent is extended or adjusted under 35 U.S.C. 154(b) by 123 days.

(21) Appl. No.: 10/231,855

(22) Filed: Aug. 30, 2002

(65) Prior Publication Data
US 2004/0040302 A1 Mar. 4, 2004

(51) Int. Cl.[7] .................. F16K 13/10; F16K 9/00; F15C 1/04; F01B 29/08; F02N 13/00
(52) U.S. Cl. .................. 60/632; 137/74; 251/11
(58) Field of Search .................. 60/632, 508, 509, 60/512, 515, 530; 137/72, 74; 251/11

(56) References Cited

U.S. PATENT DOCUMENTS

| | | | | |
|---|---|---|---|---|
| 1,921,809 A | * | 8/1933 | Crain | 137/72 |
| 3,528,449 A | * | 9/1970 | Witte et al. | 137/251.1 |
| 4,548,041 A | * | 10/1985 | Taylor | 60/632 |
| 4,612,959 A | * | 9/1986 | Costello | 137/74 |
| 6,575,188 B1 | * | 6/2003 | Parunak | 251/11 |

* cited by examiner

Primary Examiner—Sheldon J Richter
(74) Attorney, Agent, or Firm—Harness, Dickey & Pierce, P.L.C.

(57) ABSTRACT

A one-shot, electro-pneumatic actuator apparatus for quickly supplying a pressurized fluid to an external device upon the actuation of an external control signal. The actuator includes a housing having a first portion for containing a quantity of pressurized fluid, a second portion having a reduced, cross-sectional area, and a third portion. The second portion includes a sealing element disposed therein for containing the pressurized fluid held in the first housing portion. A coil is wound around the second housing portion and receives a signal from an external control subsystem which causes the coil to heat the second housing portion, and thus the sealing element, to damage the sealing element. This enables the pressurized gas to escape through the second portion into the third portion of the housing and subsequently to the external device being controlled. The actuator is extremely compact, relatively inexpensive to construct, and be actuated to release its pressurized fluid in less than about one second on the application of the control signal to the coil.

19 Claims, 1 Drawing Sheet

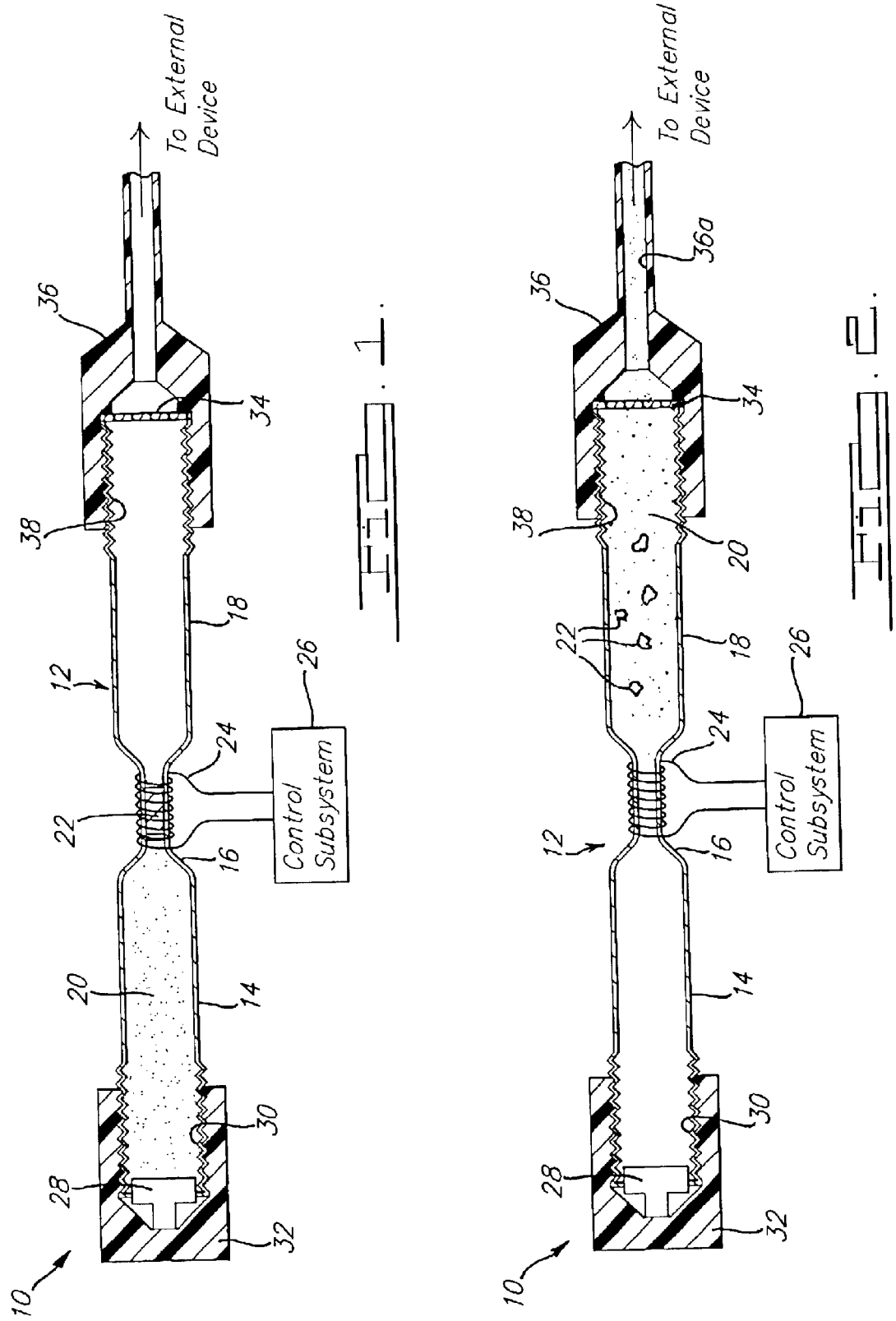

ONE-SHOT ELECTRO-PNEUMATIC ACTUATOR

FIELD OF THE INVENTION

The present invention relates to actuator devices and systems, and more particularly to a one-shot electro-pneumatic actuator apparatus that operates to rapidly discharge a pressurized fluid stored therewithin upon the application of an electrical control signal to the apparatus.

BACKGROUND OF THE INVENTION

In various commercial military aircraft and aerospace vehicles, space availability and weight are serious concerns for any components used on such vehicles. In such applications, actuator devices are often employed to perform a control function such as moving another element. Such actuators are often used in fire suppression systems and within other electronic components where it is necessary to quickly release a cooling or inert, pressurized gas into the device in the event an overheating or a fire condition occurs. Still further, such actuators are used in applications where rapid inflation of a separate pneumatic device is required upon the occurrence of a specific event.

In all of the above applications, it is imperative that the actuator be extremely compact, relatively simple in construction and cost effective to manufacture and implement. Previously developed actuators have suffered from drawbacks in one or all of these areas.

Accordingly, there is a need for an inexpensive, compact, pneumatic actuator that can be readily and cost effectively implemented into a variety of electronic systems and components for controlling a wide variety of external devices/components.

SUMMARY OF THE INVENTION

The present invention is directed to a one-shot, electro-pneumatic actuator apparatus and method for quickly releasing a pressurized fluid contained within the apparatus to control an external component/subsystem. The apparatus includes a housing having a first portion and a second portion. The first portion contains a quantity of a pressurized fluid while the second portion contains a sealing element for sealing the pressurized fluid in the first portion. The second portion is further formed from a thermally conductive material. An electrically conductive element is placed in close proximity or embedded into the second housing portion.

An external control system is used to generate an electrical signal that is applied to the electrically conductive element. In one preferred form the electrically conductive element comprises a coil wound around the second housing portion. The electrical signal causes the electrically conductive element to generate heat, that in turn heats the second housing portion and the sealing element held therewithin. The sealing element quickly melts, thus releasing the pressurized fluid through the second portion of the housing. In one preferred form, the housing includes a third housing portion formed adjacent the second housing portion for directing the pressurized fluid to an external device. The third housing portion includes a filtering element for capturing any fragments of the sealing element after same has been damaged and released from the second housing portion.

The apparatus of the present invention can be actuated within about one second or less to release its pressurized fluid. The apparatus is extremely compact, can be cost effectively produced, and includes only a very limited number of independent component parts. The apparatus is ideally suited for applications where a one-shot, electro-pneumatic actuator needs to be located in very space restricted areas, and where it would be desirable to effect control or actuation of an external component/subsystem via a pressurized fluid.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a simplified side cross sectional view of an electro-pneumatic actuator in accordance with a preferred embodiment of the present invention, before the actuator has been activated by an external, electric control signal; and FIG. 2 is a cross sectional side view of the actuator of FIG. 1 after the actuator has been activated by the external electrical control signal.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, there is shown a one-shot, electro-pneumatic actuator apparatus 10 in accordance with a preferred embodiment of the present invention. The apparatus 10 generally includes an elongated housing 12 having a first portion 14, a second portion 16 and a third portion 18. The housing 12 may be made from metal or any other material suitable for containing a pressurized fluid. In one preferred form, the housing 14 comprises an overall length of around 3 inches (7.62 cm) and a diameter of about 0.25 inches (6.35 mm). However, it will be appreciated that the housing 12 could be formed in a wide variety of dimensions and geometric shapes to suit specific applications.

The first portion 14 of the housing 12 is used to hold a pressurize fluid, and more preferably an inert gas. The inert gas may comprise nitrogen, argon or any other fluid/gas required to effect a particular control function when the apparatus 10 is activated. The pressurized gas is denoted by reference numeral 20 and is contained in the first housing portion 14 by a sealing element 22 placed in the second portion 16 of the housing 12. The second portion 16 of the housing 12 forms a substantially reduced inside diameter portion of the housing. In one preferred form, the diameter of the second portion 16 is within range of about 0.032 inch 0.125 inch (0.81 mm–3.175 mm).

Circumscribing the sealing element 22 is an electrically conductive wire or cable 24 forming a coil. The electrical cable 24 is wrapped around the second portion 16 of the housing 12 a plurality of times and is in electrical communication with a control subsystem 26. The electrical cable 24 could also be embedded within the housing 16. The control subsystem 26 applies a suitable electrical signal to the electrical conductor 24 when the apparatus 10 is activated. It will be appreciated that while the apparatus 10 requires an external electrical signal from a suitable control system for activation, that the control subsystem 26, strictly speaking, does not form a portion of the apparatus 10. The control subsystem 26 can be located either closely adjacent or remote from the apparatus 10 depending upon the system or component with which the apparatus 10 is used and the availability of the necessary space for accommodating the control subsystem 26.

With further reference to FIG. 1, the first portion 14, second portion 16 and third portion 18 are illustrated as being integrally formed as a single piece component. However, it will be appreciated that these three sections of the housing 12 could be formed as independent components and then coupled together by any suitable means, such as by threaded engagement, by adhesives, etc. If they are formed as separate components, then the first housing portion 14 and the third housing portion 18 could instead be formed from a non-metallic material so as to prevent heat transfer to the housing portions 14 and 18.

The first portion 14 preferably includes a valve 28 which allows convenient filling of the first portion with pressurized gas. In one preferred form, valve 28 comprises a well known Schrader valve. The first portion 14 may also be provided with a threaded end 30 which accepts a threaded cap 32 for sealing the valve 28 once the apparatus 10 has been filled with a pressurized fluid, thus extending the shelf life of the apparatus 10.

With further reference to FIG. 1, the third housing portion 18 preferably includes a filtering element 34. The filtering element may comprise a mesh or screen having suitably sized openings for capturing any fragments of the sealing element 22 that may be produced during activation of the apparatus 10, as will be explained more fully momentarily. In one preferred form, the screen has openings that are preferably about 0.005 inch–0.025 inch (0.127 mm–0.635 mm) in diameter, although it will be appreciated that this dimension could vary widely depending upon the material used for the sealing element 22, the overall size of the sealing element, the overall size of the apparatus 10, as well as various other factors.

The third housing portion 18 also preferably includes a delivery tube 36 which is secured thereto for directing a pressurized gas out of the housing 12 during activation of the apparatus 10. The delivery tube 36 may be secured to the third portion 18 of the housing 12 by any suitable means, but one preferred means is secured by incorporating a threaded end portion 38 on the third housing portion 18 and threadably securing the delivery tube 36 thereto.

The sealing element 22 essentially comprises a metal "plug" that is pressed into the second housing portion 16 during manufacture of the apparatus 10. The second housing portion 16 forms a thermally conductive, significantly reduced cross-sectional area portion of the housing 12. As such, the sealing element 22, once installed, is not free to move within the second housing 16 and is essentially held tightly therein by a press fit or thermal bond. The sealing element 22 may comprise a lead plug, a plug made from antimony or any other suitable metallic or plastic substance that melts rapidly upon the application of heat thereto. Of course, the dimensions of the sealing element 22 are dependent upon the interior dimensions of the second housing portion 16, but in one preferred form the sealing element 22 has a diameter of about 0.032–0.125 inch (0.81–3.175 mm) and an overall length of about 0.063 inch (1.6 mm).

Turning now to the operation of the apparatus 10, when the apparatus 10 is to be activated, the control subsystem 26 applies a suitable electrical control signal to the electrical conductor 24. The electrical control signal comprises a current suitable in amperage to cause the electrical conductor 24 to rapidly heat the second portion 16 of the housing 12. As the material forming the second portion 16 of the housing 12 becomes heated, the sealing element 22 also is heated. This causes the sealing element 22 to melt, thus allowing the pressure from the pressurized fluid 20 to force the sealing element 22 from the second portion 16 of the housing.

Referring to FIG. 2, the sealing element 22 is shown after it has been forced from the second portion 16 of the housing 12. The pressurized fluid 20 has substantially escaped from the first portion 14 of the housing 12 and is flowing through the delivery tube 36 to activate or control an external device or subsystem requiring the pressurized fluid 20. The filtering element 34 operates to catch fragments of the sealing element 22 to prevent such fragments from clogging an output port 36a of the delivery tube 36 or damaging the external device. The above-described heating and activation of the apparatus 10 occurs within an extremely short time period, and preferably within about one second or less.

The highly compact nature 10 of the apparatus 10 makes it ideally suited for use within various aircraft and aerospace devices where space is at a premium. While the apparatus 10 is illustrated as having an elongated, linear form, it will be appreciated that the housing portion 12 could just as readily be formed with a curvature if needed. This allows the housing portion 12 to be manufactured to fit precisely into very tight spaces within other components as may be needed.

A particular advantage of the apparatus 10 is its requirement of only a very limited number of independent component parts, and thus its ability to be manufactured very cost effectively. A limited number of component parts further adds to the reliability of the apparatus 10. The apparatus 10 is further capable of being stored for relatively long periods of time after manufacture is needed.

The apparatus 10 of the present invention is expected to find particular utility in a wide variety of applications and environments. For example, the apparatus 10 may be used by commercial satellites to allow an emergency high-pressure backup switch to existing electrical actuators. This includes the extension of antennas and emergency high-pressure boosters for orbital positioning. Because of the vacuum present in space, electrical arcing is always an important issue to consider. Having a pneumatic back-up device ensures a different and reliable method for the actuation of other important components.

The apparatus 10 may also be used in the fire suppression arena. Due to its small size and weight, it is ideally suited for use in portable electronic and computer equipment. Charged with an inert gas and activated by a thermistor activation device, the apparatus 10 can protect small, expensive computer equipment from damage or destruction due to excessive heat or fire.

It is also anticipated that law enforcement, and particularly bomb squads, will be able to take advantage of the apparatus 10 to safely detonate explosive devices/packages, where the fear of electromagnetic radiation may be a special concern. The apparatus 10 may also be used in underwater applications to activate a system or emergency device where it would otherwise be impossible or impractical for strictly electrical components to operate.

Those skilled in the art can now appreciate from the foregoing description that the broad teachings of the present invention can be implemented in a variety of forms.

Therefore, while this invention has been described in connection with particular examples thereof, the true scope of the invention should not be so limited since other modifications will become apparent to the skilled practitioner upon a study of the drawings, specification and following claims.

What is claimed is:

1. An electro-pneumatic actuator comprising:
   a housing having a first portion and a second portion;
   a pressurized fluid disposed within said first portion of said housing;
   a sealing component disposed within said second portion for containing said pressurized fluid within said first portion, said sealing component being operable to be at least partially, permanently damaged in response to the application of heat thereto in order to enable said pressurized fluid to be discharged through said second portion of said housing;
   a heating element disposed adjacent said second portion of said housing adapted to receive a control signal and to heat said second portion of said housing in response to receipt of said control signal, thereby damaging said sealing component and enabling the release of said pressurized fluid from said first portion into said second portion; and
   wherein said heating element comprises an electrically conductive element wound around said second portion of said housing.

2. The actuator of claim 1, wherein said housing further comprises:
   a third portion adjacent said second portion for discharging said pressurized fluid as said sealing element is damaged; and
   a filtering element disposed within said third portion for capturing fragments of said sealing element as said sealing element becomes damaged.

3. The actuator of claim 1, wherein said sealing element comprises a tin plug.

4. The actuator of claim 1, wherein said sealing element comprises a lead plug.

5. The actuator of claim 1, wherein said sealing element comprises a sealing plug comprised of antimony.

6. The actuator of claim 1, wherein said second portion of said housing comprises a smaller cross sectional area than said first portion.

7. The actuator of claim 1, further comprising a valve disposed in communication with said first housing portion for facilitating filling and containment of said pressurized fluid within said first housing portion.

8. The actuator of claim 7, further comprising a cap adapted to be releasably secured over said valve.

9. An electro-pneumatic actuator comprising:
   a housing having a first portion and a second portion formed adjacent one another;
   a pressurized fluid disposed within said first portion of said housing;
   a sealing component disposed within said second portion for containing said pressurized fluid within said first portion, said sealing component being operable to be at least partially, permanently damaged in response to the application of heat thereto in order to enable said pressurized fluid to be discharged into and through said second portion of said housing;
   a heating coil circumscribing said second portion of said housing and adapted to receive an electrical control signal and to rapidly heat said second portion of said housing in response to receipt of said electrical control signal, thereby rapidly damaging said sealing component and enabling the release of said pressurized fluid from said first portion into said second portion; and
   a valve disposed in communication with said first portion of said housing for facilitating filling of said first portion with said pressurized fluid.

10. The actuator of claim 9, further comprising a cap disposed over said valve.

11. The actuator of claim 9, wherein said sealing component comprises a lead plug.

12. The actuator of claim 9, wherein said sealing component comprises a plug formed of antimony.

13. The actuator of claim 9, wherein sealing component comprises a metallic plug.

14. The actuator of claim 9, wherein:
    said housing further comprises a third portion formed adjacent said second housing portion for discharging said pressurized fluid upon damage to said sealing element; and
    a filtering element disposed in said third portion for capturing fragments of said sealing component as said sealing component is damaged.

15. A method for forming a pyrotechnic actuator comprising:
    using a housing having a first portion to house a pressurized fluid;
    placing a seating element within a second portion of said housing, wherein said second portion is formed adjacent said first portion, for containing said pressurized fluid within said first portion;
    placing an electrically conductive element adjacent said second portion of said housing;
    applying an electrical control signal to said electrically conductive element to thereby cause said electrically conductive element to rapidly heat said sealing element and rapidly, permanently damage said sealing element, thereby enabling said pressurized fluid to be discharged through said second portion of said housing; and
    coupling a valve to said first portion of said housing to facilitate filling and containment of said pressurized fluid within said first portion.

16. The method of claim 15, wherein using said sealing element comprises using a metallic plug.

17. The method of claim 15, wherein using said sealing element comprises using a lead plug.

18. The method of claim 15, wherein using said sealing element comprises using a plug comprised of antimony.

19. The method of claim 15, further comprising disposing a filter within a third portion of said housing adjacent and in communication with said second portion, said filter operating to capture fragments of said sealing element as said sealing element is damaged during actuation of said actuator.

* * * * *